AUTOMATIC AMPLITUDE CONTROL IN LINE TRANSMISSION OF
HIGH FREQUENCY OSCILLATIONS
Filed Nov. 7, 1963

INVENTOR.
ALOYSIUS F. CIFELLI
BY
Fordyce A. Bothwell
ATTORNEY

United States Patent Office 3,233,193
Patented Feb. 1, 1966

3,233,193
AUTOMATIC AMPLITUDE CONTROL IN LINE TRANSMISSION OF HIGH FREQUENCY OSCILLATIONS

Aloysius F. Cifelli, Philadelphia, Pa., assignor to Philco Corporation, Philadelphia, Pa., a corporation of Delaware Filed Nov. 7, 1963, Ser. No. 322,172
4 Claims. (Cl. 331—183)

This invention relates to amplitude control of high frequency oscillations and more particularly to amplitude control of high frequency oscillations which are transmitted from a source location over a transmission line, such as a coaxial cable, of substantial length to a remote location.

The invention is applicable, for example, to sweep frequency generation and transmission systems wherein oscillations of different high frequencies extending over a desired frequency band or range are transmitted to a remote location for use at such location. One use of such a system is in a production factory where it is necessary to provide such oscillations at a test site remote from the sweep generator.

In such a system it is desirable that the oscillations at the remote location be of constant amplitude. For example, in the testing of an amplifier it is desirable that the test oscillations be of constant amplitude to enable accurate observation of amplitude variations due to the amplifier circuit under test. While it is possible to provide automatic amplitude control of an oscillator so as to generate oscillations of predetermined amplitude, the transmission line itself tends to cause amplitude variations of the transmitted oscillations.

In the past various attempts were made to overcome this objection. For example, different cables were tried until a cable which gave minimum amplitude variation was found. This was tedious and time consuming and it did not provide a satisfactory solution of the problem. Another attempt to solve the problem involved adjustment of the sweep generator to give a tolerable signal at the remote location. This often resulted in a signal at the generator which had considerable amplitude variation with frequency. Such a signal is difficult to monitor at the generator.

The principal object of the present invention is to provide a satisfactory solution of this problem.

Another object of the invention is to provide a system arrangement which enables flat transmission of a wider range of frequencies than has heretofore been possible.

In accordance with this invention, provision is made for producing at the remote location a signal which is indicative of the amplitude of the high frequency oscillations at said location, and provision is also made for sending this signal back over the transmission line to the source location where it is utilized to control the oscillation generator so as to maintain substantially constant amplitude of the oscillations at the remote location.

The invention may be fully understood from the following detailed description with references to the accompanying drawing, wherein—

Figure 1:
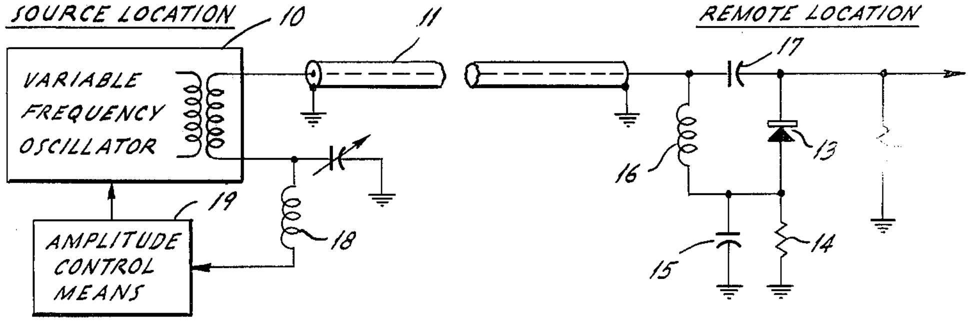
Figure 2:
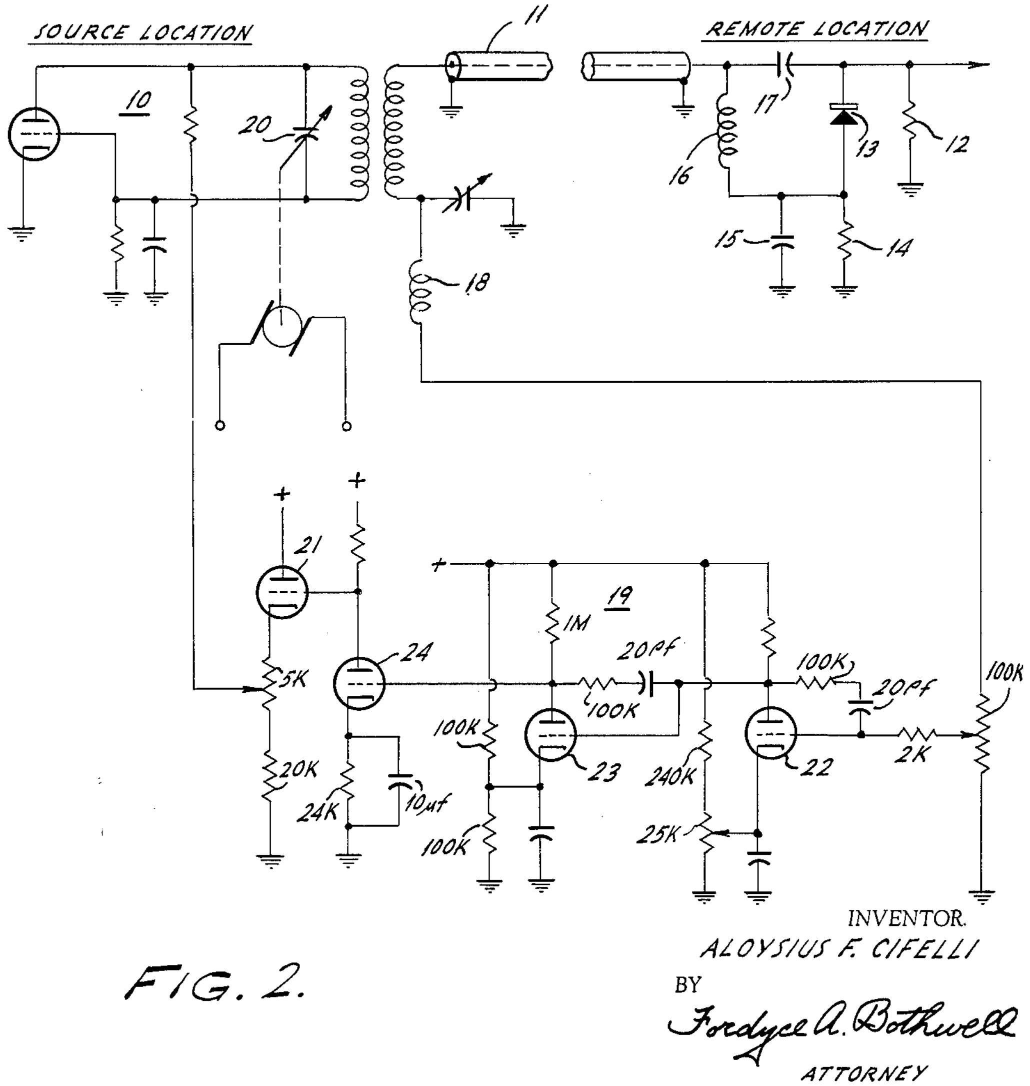

FIG. 1 is a diagrammatic illustration of a line transmission arrangement embodying the present invention; and FIG. 2 is a similar illustration showing an oscillator control arrangement which may be employed.

Referring first to FIG. 1 of the drawing, there is shown a system wherein high frequency (R.F.) oscillations are produced at the source location by a variable frequency oscillator 10 which may be any conventional oscillator adapted for amplitude control, and said oscillations are transmitted over a coaxial cable 11 of substantial length (e.g. several hundred feet) to a remote location at which said oscillations are available across the termination resistor 12.

In such a system it is desirable that the oscillations at the remote location be of constant amplitude, but amplitude variations tend to occur due to cable deficiencies and standing waves, as well as deficiencies of the oscillator.

In accordance with this invention, a signal indicative of the amplitude of said oscillations is produced at the remote location and is applied to the cable 11 for transmission back to the source location. To this end a conventional detector arrangement is provided comprising a diode 13, resistor 14 and capacitor 15. By this arrangement a D.C. signal is produced across resistor 14, which varies in amplitude according to any amplitude variation of the high frequency oscillations. This signal is applied to the cable 11 through inductor 16 which has low impedance for the D.C. signal. Capacitor 17 is a blocking capacitor which has high impedance for the D.C. signal but low impedance for the high frequency oscillations.

The D.C. signal is transmitted over cable 11 to the source location where it is supplied through inductor 18 to amplitude control means 19. Inductor 18 has low impedance for said signal but has high impedance for the high frequency oscillations. The amplitude control means 19 may be any conventional means for amplitude control of the oscillator. In fact most commercial R.F. sweep generators have an internal leveling circuit which may serve as the amplitude control means 19. The control of the oscillator in response to the D.C. signal serves to maintain the amplitude of the high frequency oscillations at the remote location substantially constant.

This invention thus provides a novel and highly efficient arrangement in which a correction signal is produced at the remote location and is transmitted over the same line or cable which transmits the high frequency oscillations. In this connection it should be noted that the D.C. control signal is not appreciably attenuated by the transmission line and is not affected by standing waves. In addition to being simple and reliable, the arrangement provided by this invention enables transmission of a wider band of frequencies than has heretofore been possible.

In cases where the generator power is low, transistors may be employed at the remote location to amplify the correction signal.

FIG. 2 shows an oscillator control arrangement which has been employed in experimental practice of this invention. The oscillator or sweep frequency generator 10 produces oscillations of varying frequency under control of the motor-driven tuning capacitor 20. The amplitude of the oscillations is controlled by controlling the oscillator's operating voltage through control of tube 21. The control signal is supplied through inductor 18 to the amplitude control or leveling circuit 19 which comprises tubes 22 to 24. The signal voltage at the plate of tube 24 is applied to the grid of tube 21 to control the latter. The circuit 19 is a conventional multi-stage D.C. amplifier, each of the amplifying stages including a grid-controlled vacuum tube and a plate load resistor, with the output voltage derived from the junction of the plate and the load resistor and applied to the grid of the next tube.

With normal amplitude of the oscillations at the remote location, the system is in a quiescent state. Whenever there is a change in said amplitude, there is a corresponding change in the D.C. voltage fed back to tube 22. This change is amplified in the D.C. amplifier stages comprising tubes 22 to 24, and the amplified change varies the conductivity of tube 21 to change the plate voltage of oscillator 10 so as to restore the normal amplitude of the oscillations at the remote location.

Thus the system is a bidirectional servo system which responds to departure from a desired normal condition and effects corrective action to restore the normal condition.

While the invention has been illustrated and described with reference to a preferred embodiment, it will be understood that the invention is not limited thereto but contemplates such modifications and further embodiments as may occur to those skilled in the art.

I claim:

1. In combination, a high-frequency oscillation generator, a transmission line, means for applying the generated oscillations to said line for transmission to a remote location, means at said remote location for detecting said oscillations and for producing a D.C. control signal indicative of amplitude of the oscillations at said remote location as affected by the transmission, means for applying said control signal to said line for transmission to the location of said generator, and means at the latter location responsive to said control signal for controlling said generator so as to maintain the amplitude of the oscillations at said remote location substantially constant and substantially independent of undesirable fluctuation due to the transmission line.

2. The combination according to claim 1, wherein said transmission line is a coaxial line.

3. In combination, a high-frequency oscillation generator operable over a range of frequencies, a transmission line, means for applying the generated oscillations to said line for transmission to a remote location, means at said remote location for detecting said oscillations and for producing a D.C. control signal indicative of amplitude variations of the oscillations at said remote location due to frequency sensitivity of the transmission line, means for applying said control signal to said line for transmission to the location of said generator, and means at the latter location responsive to said control signal for controlling said generator so as to maintain the amplitude of the oscillations at said remote location substantially constant and substantially independent of undesirable fluctuation due to the transmission line.

4. The combination according to claim 3, wherein said transmission line is a coaxial cable.

References Cited by the Examiner

UNITED STATES PATENTS 2,733,340 1/1931 Garner et al. ________ 331—183

FOREIGN PATENTS 453,837 1/1949 Canada.

ROY LAKE, *Primary Examiner.*

JOHN KOMINSKI, *Examiner.*